April 7, 1953 B. R. CARSON 2,634,135

AUTOMATIC PHONOGRAPH RECORD PLAYING MECHANISM

Filed March 31, 1949 6 Sheets-Sheet 1

INVENTOR
BENJAMIN R. CARSON
BY H. L. Newton
ATTORNEY

April 7, 1953 B. R. CARSON 2,634,135

AUTOMATIC PHONOGRAPH RECORD PLAYING MECHANISM

Filed March 31, 1949 6 Sheets-Sheet 2

INVENTOR
BENJAMIN R. CARSON
BY H. L. Mewton
ATTORNEY

April 7, 1953 B. R. CARSON 2,634,135

AUTOMATIC PHONOGRAPH RECORD PLAYING MECHANISM

Filed March 31, 1949 6 Sheets-Sheet 3

INVENTOR
BENJAMIN R. CARSON
BY H. H. Newton
ATTORNEY

April 7, 1953 B. R. CARSON 2,634,135

AUTOMATIC PHONOGRAPH RECORD PLAYING MECHANISM

Filed March 31, 1949 6 Sheets-Sheet 4

INVENTOR
BENJAMIN R. CARSON
BY H.D. Newton
ATTORNEY

April 7, 1953 B. R. CARSON 2,634,135

AUTOMATIC PHONOGRAPH RECORD PLAYING MECHANISM

Filed March 31, 1949 6 Sheets-Sheet 5

INVENTOR

BENJAMIN R. CARSON

BY H. W. Newton

ATTORNEY

AUTOMATIC PHONOGRAPH RECORD PLAYING MECHANISM

Filed March 31, 1949 6 Sheets-Sheet 6

INVENTOR
BENJAMIN R. CARSON
BY H. L. Weston
ATTORNEY

Patented Apr. 7, 1953 2,634,135

UNITED STATES PATENT OFFICE 2,634,135

AUTOMATIC PHONOGRAPH RECORD PLAYING MECHANISM

Benjamin R. Carson, Haddonfield, N. J., assignor to Radio Corporation of America, a corporation of Delaware Application March 31, 1949, Serial No. 84,502

14 Claims. (Cl. 274—10)

This invention relates to automatic phonograph record playing mechanisms of the type known generally as automatic record changers. Such record changers, as is well known, include motor driven record turntable means, tone arm means provided with a transducer or pick-up device having an operating stylus for engaging a record groove, and record handling means operatively associated and coordinated to reproduce recordings on flat disc records in predetermined sequence automatically.

Heretofore such mechanisms have been designed to operate with relatively large and thick records of the flat disc type in a variety of sizes or diameters, generally of ten or twelve inches, having a playing or record surface adapted for recordings of the order of from three to five or six minutes duration, with a standard speed of approximately 78 revolutions per minute. In fact, when the phonograph and record industries had their commercial beginnings almost a half century ago, the size of the records and the rotational speed of the turntable were established on a basis which was largely a matter of experimental compromise based on the state of the art at that time. These so-called standards of record size at 10 and 12 inches in diameter, and turntable speed at 78 revolutions per minute, have remained unaltered for almost fifty years.

While there have been some noteworthy refinements of record making and playing techniques, these were accomplished within the pre-established limitations of record size, groove dimensions, and turntable speed. Record changing mechanisms, in particular, have been handicapped by the requirement that they accommodate both 10-inch and 12-inch records. Further, records have been costly, fragile, subject to wear, of limited quality, and inconvenient to handle and to store. The result of this situation has been that a truly satisfactory performance seemed to be unattainable within the limitations of the system as established. It has become evident that an entirely new approach must be made, namely, one specifically designed to eliminate these problems and limitations.

Experience has shown that any major change in an existing, long established system must do more than solve problems related to the accomplishment of just satisfactory performance. It might be stated that such a change can only be justified if its accomplishments reasonably approach the requirements of an ideal system. It is toward this end that the automatic phonograph record playing mechanism of the present invention is directed, and it is a primary object of this invention to provide an improved and coordinated system in the art of record handling and reproduction through which may be effected a fundamental improvement in the reproduction of recorded music. Factors of cost and convenience to the user, extended playing time, record life, and freedom from distortion are all included in the consideration of the problem of producing substantially an ideal record changing and handling mechanism and associated record.

The problem of handling records of relatively large size and weight, with respect to the recording material thereon, and playing such records of differing diameters intermixed, is one which heretofore has never been met successfully or satisfactorily. The mechanisms required have not only been costly and bulky as well as complicated in operation and for servicing, but also the recordings in themselves have been subject to breakage and difficulties in storage and handling and have involved the use of low cost materials in order to maintain a satisfactory price level, or have been of relatively high cost when more satisfactory materials were used because of the mass of material required.

It is, therefore, a further and important object of this invention, to provide an improved automatic phonograph record playing mechanism which effectively overcomes substantially all of the major difficulties and disadvantages inherent in previous devices of that character, and which may utilize thin, flat disc records of relatively small diameter, and operate at an optimum slow speed without sacrificing playing time or quality in the reproduction from or recording on such records.

It is also an object of this invention, to provide an improved automatic phonograph record playing mechanism of the drop type wherein a series of records in a stack are dropped successively onto a playing turntable which operates with a minimum record changing time, substantially silently, in connection with disc records having an enlarged central spindle hole, whereby damage to the records is substantially prevented and convenience of operation enhanced.

It is an object of this invention, furthermore, to provide an improved automatic record changer of the character referred to, whereby all records may have an optimum and the same relatively small diameter and each may be provided with a lead-in groove, thereby eliminating the necessity for mechanical lead-in means heretofore forming part of known record changing mechanisms, and which further operates in response to tripping action at one common diameter without power or force on the stylus.

A further and important object of this invention, is also to provide an improved record changer mechanism that is adapted to operate with and handle flat disc phonograph records of reduced size adapted for lower load, easier handling, and less storage space, and of improved record materials which normally are considered too expensive for the large conventional records.

In order to accomplish this object, the speed of the record is materially reduced, while at the same time providing the same or longer playing time with comparable record quality, or better than has heretofore been known with standard flat disc records of the usual ten and twelve inch diameter type. With such records the record changer operation is confined wholly to the inner or central spindle opening which is increased in diameter to permit record changer operation and control within the spindle proper.

Records of the type contemplated for use with the record changer mechanism of the present invention may have a counterbored surface surrounding an inner central, large-diameter spindle opening providing a central shoulder or ridge in spaced relation to the faces or a hub portion of the record surrounding the opening. With this arrangement the record, having a counterbored surface on each side of the central opening, provides for positive record changer operation regardless of record thickness variations.

It is also an object of the invention, to provide an automatic record changer mechanism for phonograph records and the like which is of relatively small size, such that the overall size of record-changer radio-phonograph combinations may be reduced at least to approximately one-quarter of the size of such present known combinations, without sacrificing the quality or rendition time of the reproduction, and at a greatly reduced cost.

One of the many disadvantages of known automatic record changer mechanisms of the record-drop type, lies in the fact that extensive reduction-geared cycling means is considered necessary to do the work of record changing with any degree of smoothness, quietness, and with a desired speed. It is also desirable that the entire cycling or record changing cycle be performed in a minimum time. This is accomplished by the mechanism of the present invention substantially within the time of one revolution of the turntable, and with substantially light loading of the driving motor means. With a relatively slow speed record as provided, the cycling time is relatively short and approaches a changing speed which may be considered substantially instantaneous.

It is also, therefore, an object of the invention to provide an improved record changer mechanism of the record-drop type which eliminates complicated and expensive geared cycling means, and which may have a cycling operation effectively within one revolution of the turntable. Sufficient time is afforded for all operations, even with a slower speed turntable of the order of 45 R. P. M., because of the greatly reduced work required in handling the relatively light and reduced record load, and this is reflected in a much lower cost for the entire mechanism.

It is a related object of the invention, furthermore, to provide an improved and simplified automatic record changing mechanism which combines an effective and sensitive trip means with the record changing means, whereby the tone arm and stylus are in no way loaded while the changing cycle is completed with one revolution of a continuously revolving turntable, and which permits the turntable to revolve with the records and the change to be effected without interfering with, stopping or reducing the speed of the turntable rotation.

Other and important objects of the invention will appear hereinafter. However, in general it should be understood that it is an object of the invention to provide a coordinated record changer mechanism and record handling arrangement together with a record, whereby it is possible to produce a phonograph playing means or instrument of high performance with minimum cost. This has required coordination with the record requirements of both the record handling arrangement and the record handling mechanism involving determining a fundamental speed of rotation which affords maximum tone quality in reproduction with a minimum cost in both the record means and the record changing means.

For this purpose a speed of the order of 45 R. P. M. has been determined, as well as a small convenient record which will carry a recording having a longer playing time than has heretofore been practicable. If a relatively higher speed than 45 R. P. M. is used, it is found that the small convenient record will not carry enough recording to provide the desired playing time, and if a record of this size rotates at a relatively slower speed, part of the recording, such as music, inevitably becomes distorted.

It is, therefore, an object of this invention, to provide an improved record changing mechanism which operates at an optimum speed of rotation of the turntable of the order of 45 R. P. M. and which permits complete cycling or change from one record to the next within one revolution of the turntable means, whereby the time duration between records is at a minimum, and which at the same time permits full high quality reproduction of the recording without distortion.

Further considering the combination of relatively low speed without sacrificing playing time or tone quality, and low cost for both record and record playing mechanism, it may be pointed out that other and important objects of the invention are as follows:

1. To provide an automatic record changer mechanism adapted for use with small diameter records of the disc type having a reduced turntable speed, adapted for a groove velocity and a reproducing stylus radius such that any intermodulation distortion in the reproduction is held below limits found to be satisfactory for a high degree of fidelity of reproduction.

2. To provide an automatic record changer mechanism which is operable with sufficient power to initiate and complete a record changing cycle with substantially minimum stylus pressure between the sound recording on the record and the sound reproducing transducer means.

3. To provide an improved automatic phonograph mechanism wherein a stack of thin, lightweight, small diameter records having an enlarged central spindle opening within a thickened central hub portion, may be carried on a single enlarged central post or spindle and released on a turntable under control of a selector mechanism wholly contained within the center post. For simplifying the mechanism and reducing the cost thereof, as well as for improving the cycling time, a cam is formed integral with the turntable and used as the cycling control element, while two movable, planetary gear driven rests or record shelves in the center post of the turntable and two record separator plates or knives operate jointly in timed relation with the rests or shelves for single record transfer from a stack on the spindle, thereby providing operational control of the records wholly from the center of the record stack. Furthermore, the rests are so designed as to retract when played records are removed from the turntable, wholly automatically without manual assistance other than to lift the stack from the turntable and off the enlarged central spindle.

4. To provide an improved low-cost automatic phonograph record playing mechanism of the class described, for relatively small diameter records, which is a complete unitary record changer mechanism adapted to be suspended from a single supporting plate or base, and which performs all functions for controlling and playing records with a minimum movement of parts and a high degree of operating efficiency, and with a record changing or cycling speed of operation which is substantially instantaneous.

5. To provide a novel trip mechanism for an automatic record changer which initiates the record changing cycle with a minimum amount of pressure required at the stylus point of the reproducing transducer means and which is operable for tripping and resetting with a common actuating means or lever.

As briefly referred to hereinbefore, in carrying the invention into effect, a planetary system of gearing having a main or sun gear engaging a pair of oppositely disposed planet or pinion gears is provided in a central vertical cylindrical housing forming part of the turntable and used as a spindle therefor. The planetary system of gearing actuates record supporting and selecting elements from a single main shaft emanating from the center post.

A star wheel secured to the main shaft of the record changing mechanism provides simple and effective means in conjunction with a main lever for operating the planetary system and timing the operation of the record support and record playing elements in proper relation at predetermined operating intervals during a record changing cycle. In connection with this mechanism, a novel and simplified arrangement for elevating and operating the tone arm during a portion of the record changing cycle is likewise provided and coordinated with the control of the record stack as above mentioned.

In operation, the center shaft and its main gear are held immobile for a sufficiently long time duration to cause the driven planetary pinions, which revolve about the main gear independently, to rotate substantially a full 360 degrees during each record changing operation cycle, thereby to assure a desired positioning of the record support and separator elements at the conclusion of each record changing operating cycle.

Considering prior known record changers and the disadvantages thereof, it will be seen that such devices are required to operate with records (1) uniform in thickness over their entire area, (2) having a small center hole, and (3) of at least two different diameters.

All record changers require a selecting mechanism to separate individual records from a stack. This is particularly true of the record-drop type mechanisms which carry records on a stack above the turntable and selectively permit them to drop onto the turntable in stacked relation, the top record being played in each case. With records of uniform thickness, known practical designs of selecting mechanism may cause some damage to the edge, body or center hole area of the record. With a small center hole and the heavy records commonly used, high stress occurs and record damage results. A small center hole does not permit record stability on the spindle without the well known edge support and complex spindle mechanisms of the known prior art. Furthermore, the small center hole makes loading difficult.

The necessity of accommodating two diameters brings about record changer complexity and customer inconvenience. The varying magnitude of the diameters makes the record changing mechanism big. Cabinets to accommodate such record changers and also to provide storage become large and therefore expensive. The relatively high rotational speed of the turntable necessitates the use of speed reducing mechanism to give the record changer time to perform its several functions reliably.

The solution of these problems in accordance with the invention includes a consideration of the ideal minimum space requirements, minimum costs, maximum performance, and maximum convenience of customer operation, involves a major change from existing practice, and results in an improved and simplified record changer mechanism which satisfies the following conditions:

1. A large center spindle housing the record releasing and separating means. It is found that a spindle of the order of one and one-half inches in diameter may house an economical and efficient selecting mechanism, provide adequate record stability on the spindle without external support, and make for easy loading of records on the spindle.

2. Provision of a depressed area around the center hole of the record on either side and resulting inner flange or shoulder for the entry of selector plates which do not otherwise touch the records during the separating operation.

3. A relatively small, single-diameter record having fixed dimensions for starting and tripping grooves so as to reduce record changer complexity, and an outer recording zone which has comparable inner and outer diameters and a groove speed for high fidelity reproduction which is substantially constant.

4. A small diameter record, rotating at a slow speed. The small diameter results in a reduction in size of the record changer and permits a decrease in the inertia of the tone arm. The decreased inertia of the tone arm permits a reduction in cycle time. Then by choice of a low rotational speed, it is possible to accomplish the complete change cycle in one revolution or less of the turntable. The cycling cam may thus be made integral with the turntable, or carried thereby, thereby eliminating any speed reducing means. It was found by extensive experiment and design data that a rotational speed of 45 R. P. M. is consistent with meeting these design requirements.

The foregoing considerations have provided a record changer mechanism which is of relatively minimum cost, presently weighing less than six pounds complete with housing, having an overall height of the order of six inches, an overall width of the order of nine inches, and an overall depth of the order of seven inches.

The record itself, coordinated for playing on this mechanism, is shown, described and claimed, as to its various features of novelty, in two co-pending applications assigned to the same assignee as this application as follows: (1) H. E. Roys, A. D. Burt and H. I. Reiskind, for Disk Phonograph Record, Serial No. 85,528, filed March 31, 1949, and (2) H. I. Reiskind, B. R. Carson and G. W. Longacre, for Light-Weight Phonograph Record, Serial No. 80,922, filed March 11, 1949, now abandoned.

The record has substantially a distortion-free recording area surrounding a central hub provided with a large spindle opening and inner flange, and is adapted to play on a miniature turntable much less than seven inches in diameter, and uses a minimum of materials, including a thin outer web, for carrying the recording, whereby the material may be of the highest quality without excessive cost.

Various considerations in the selection of the recording level and reproducing stylus size have resulted in a present preferred terminal linear speed of recording of the order of 11.5 inches per second, to provide a minimum and imperceptible intermodulation distortion in the innermost groove. Furthermore, as a result of an analysis of the requirements for an optimum playing time, it has been determined that a playing time of approximately five minutes, or substantially the same as that of a standard 12-inch 78 R. P. M. record, may represent the present optimum. With this playing time and linear speed, approximately 275 grooves per inch provide a relatively small diameter record of less than seven inches and one which satisfactorily carries all types of recording, with only one size of diameter.

The mechanism of the present invention is adapted to operate in conjunction with this type of record, and provides for reproducing the recorded program from an outer quality zone of reproduction which is substantially free of intermodulation distortion at the selected slow speed of 45 R. P. M. Furthermore, for facilitating the handling of light-weight, small, thin, hubbed records, a central post, drop type of record changer mechanism is provided in accordance with the invention.

The novel features that are considered to be characteristic of the present invention are set forth with particularity in the appended claims. The invention itself, both as to its organization and method of operation, as well as additional objects and advantages thereof, will be further understood from the following detailed description of a present preferred embodiment thereof, as shown in the accompanying drawings, in which:

Figure 1:
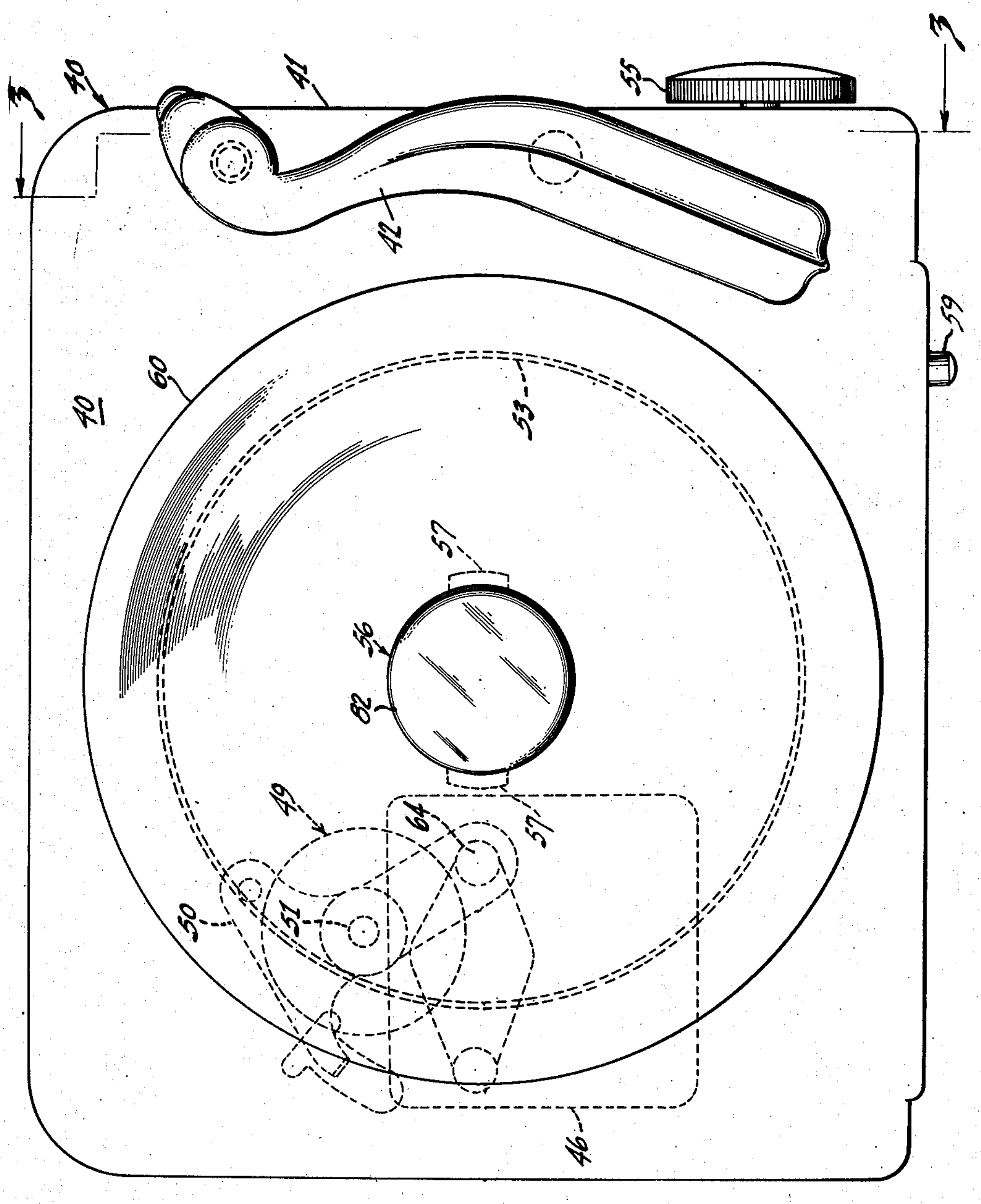
Figure 1 is a top view of an automatic record changer or automatic phonograph record playing mechanism embodying the invention, and showing a record supporting center post disposed in relation to a tone arm, and a stack of small diameter records disposed in an operating position thereon.
Figure 2:
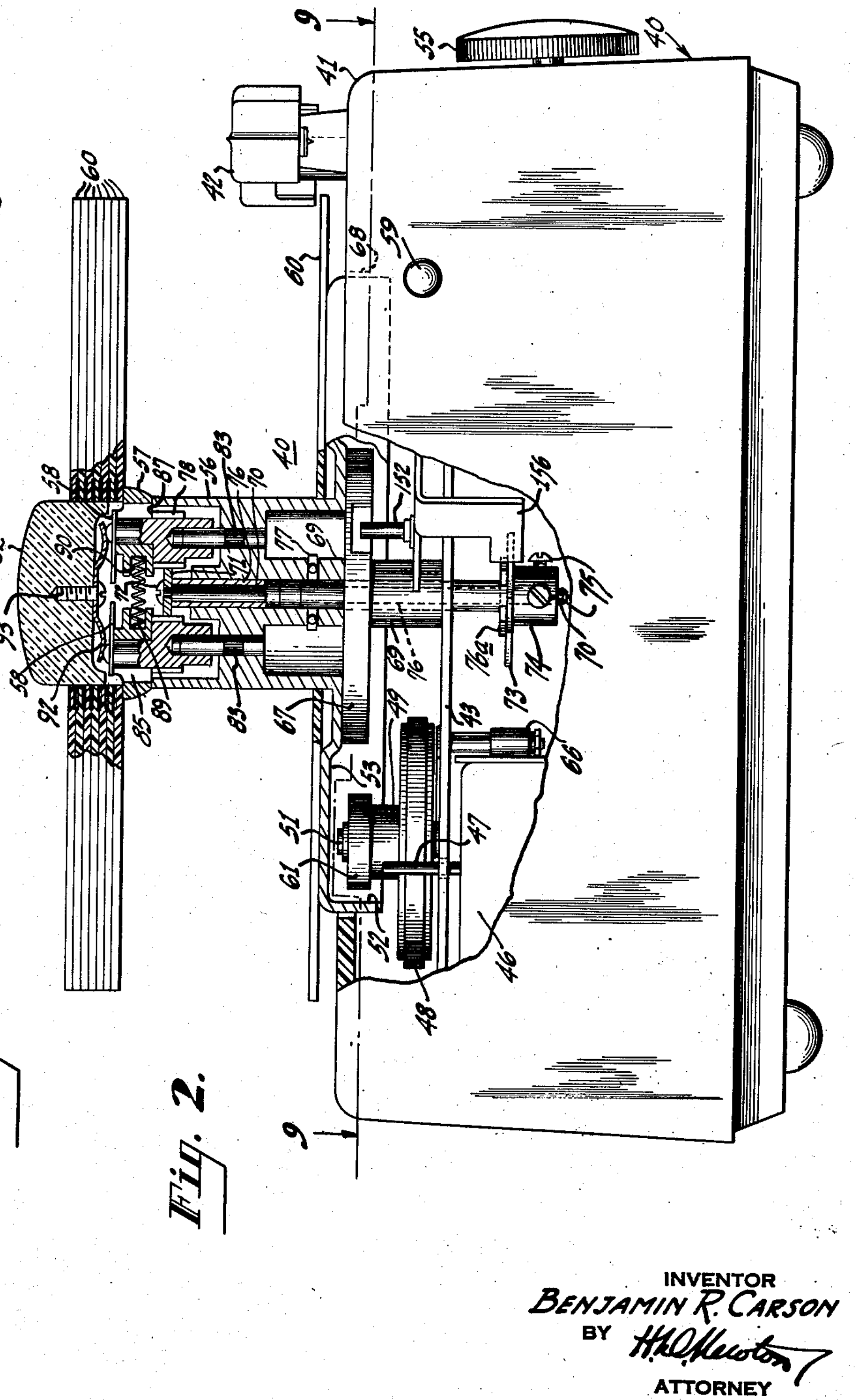
Figure 2 is a front view of the automatic record changer of Figure 1, with a portion of the record changer housing and center post partially broken away to show certain details of the operating mechanism, in accordance with the invention.
Figure 3:
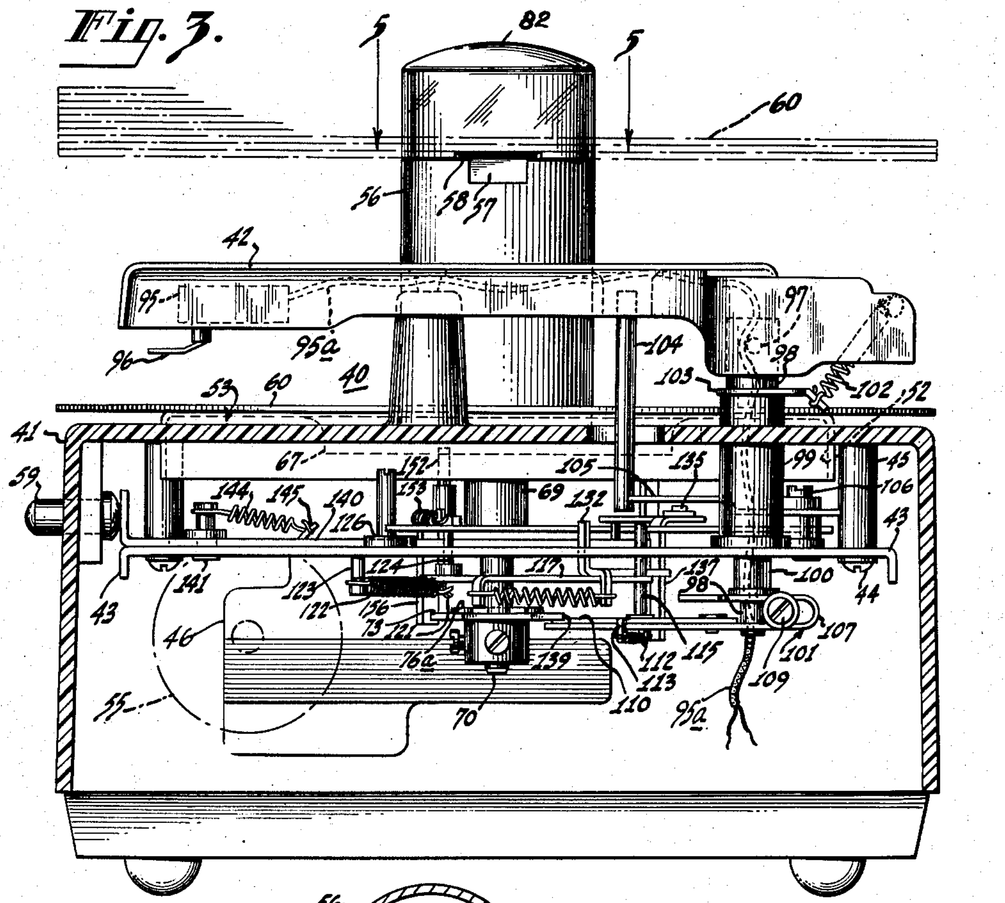
Figure 3 is a view in elevation, and partly in cross-section, taken substantially along lines 3—3 of Figure 1, showing the arrangement of certain portions of the interior operating mechanism of the record changer, also in accordance with the invention.
Figures 5, 6, 7, 8:
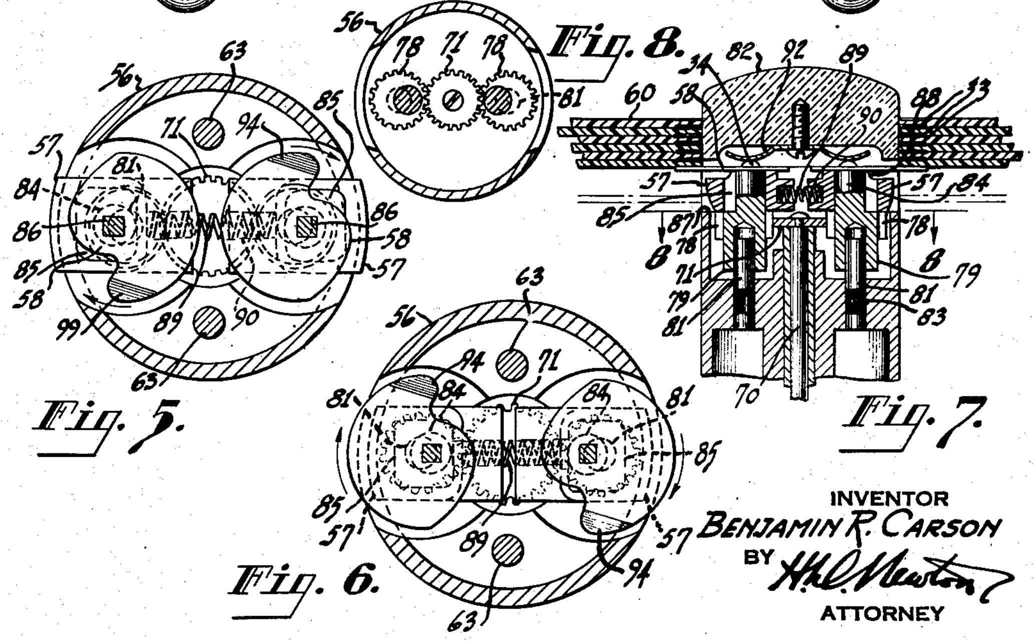
Figure 9:
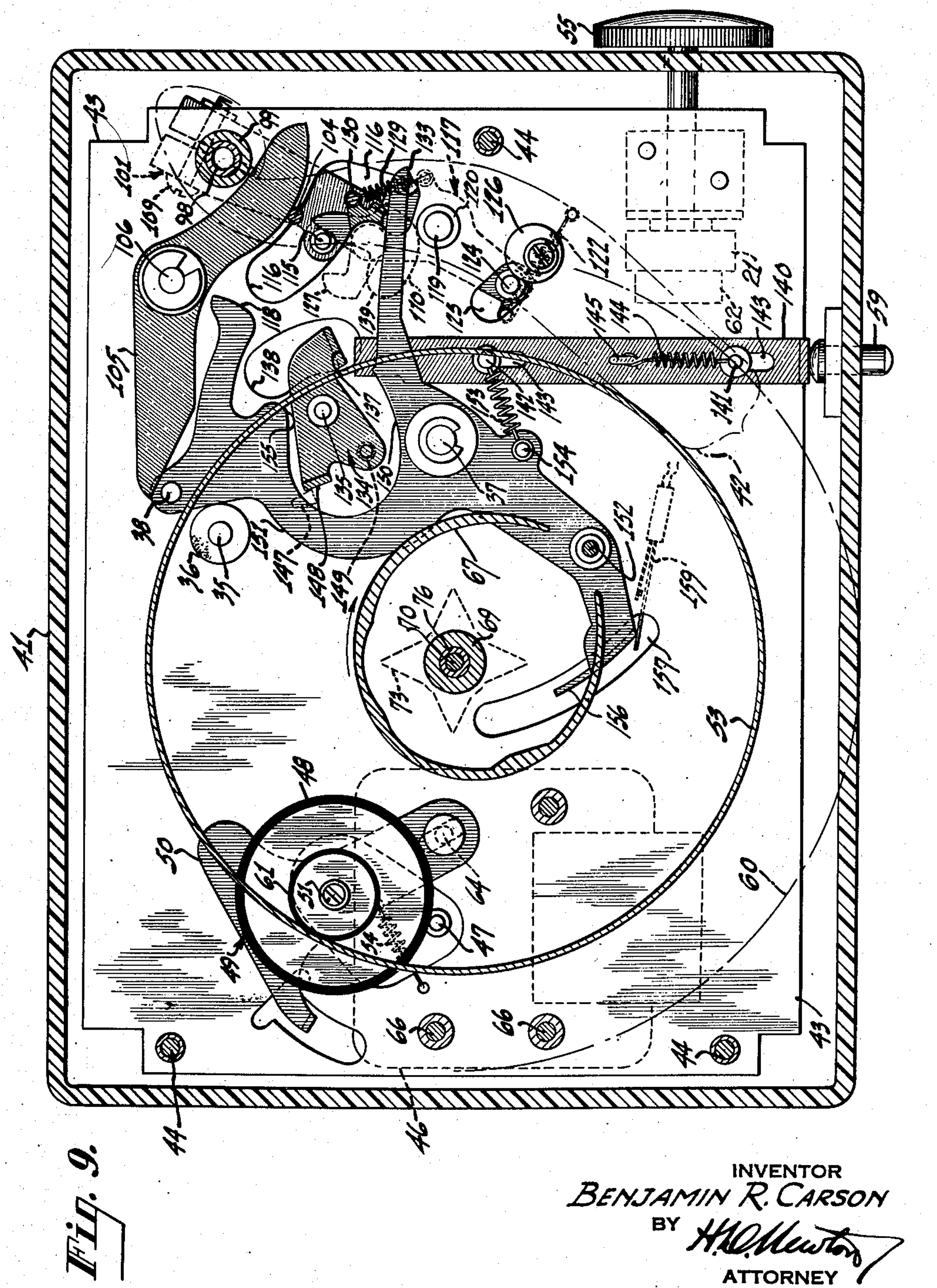
Figure 11:
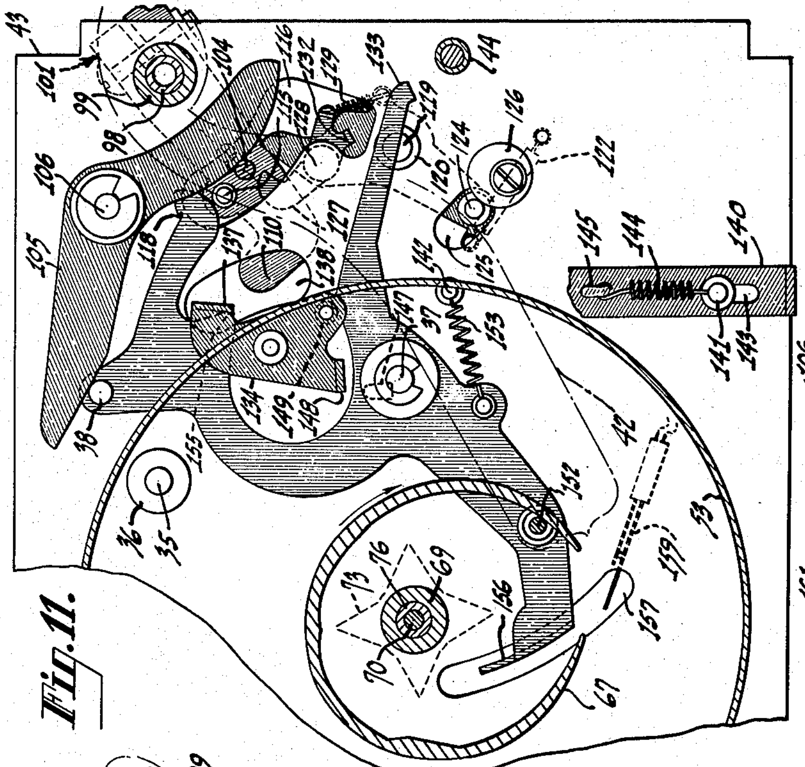
Figure 11A:
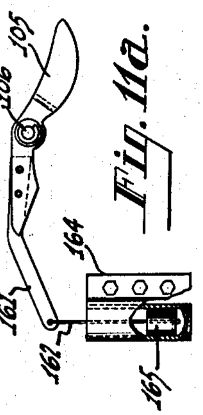
Figure 10:
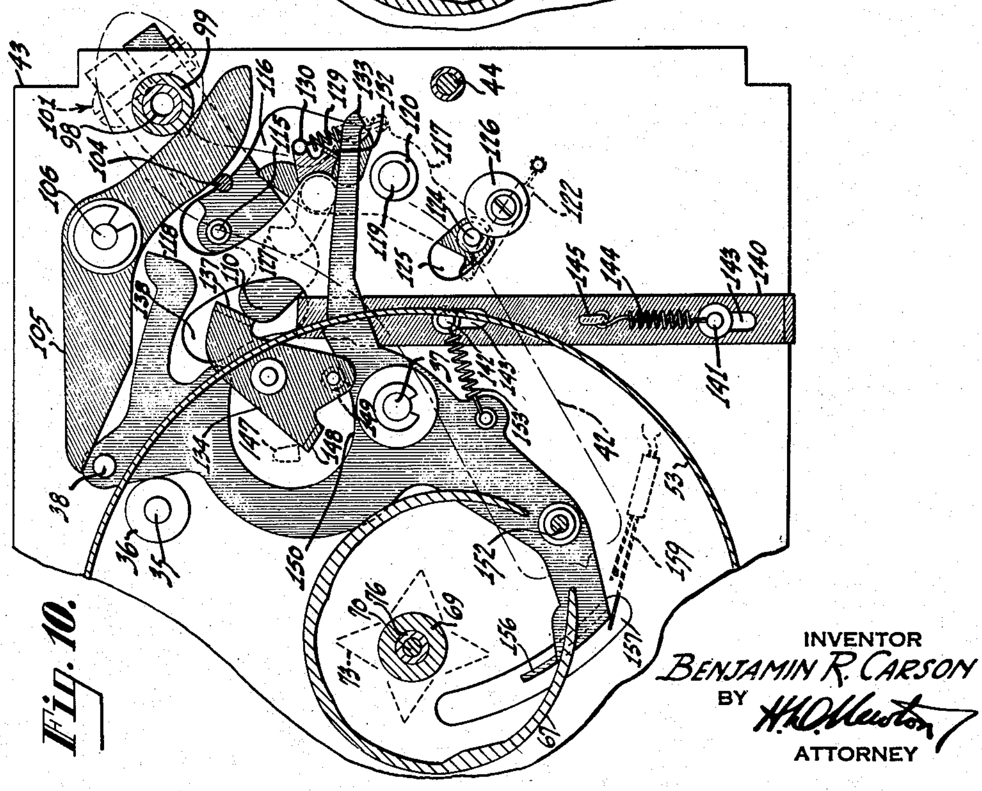
Figure 12:
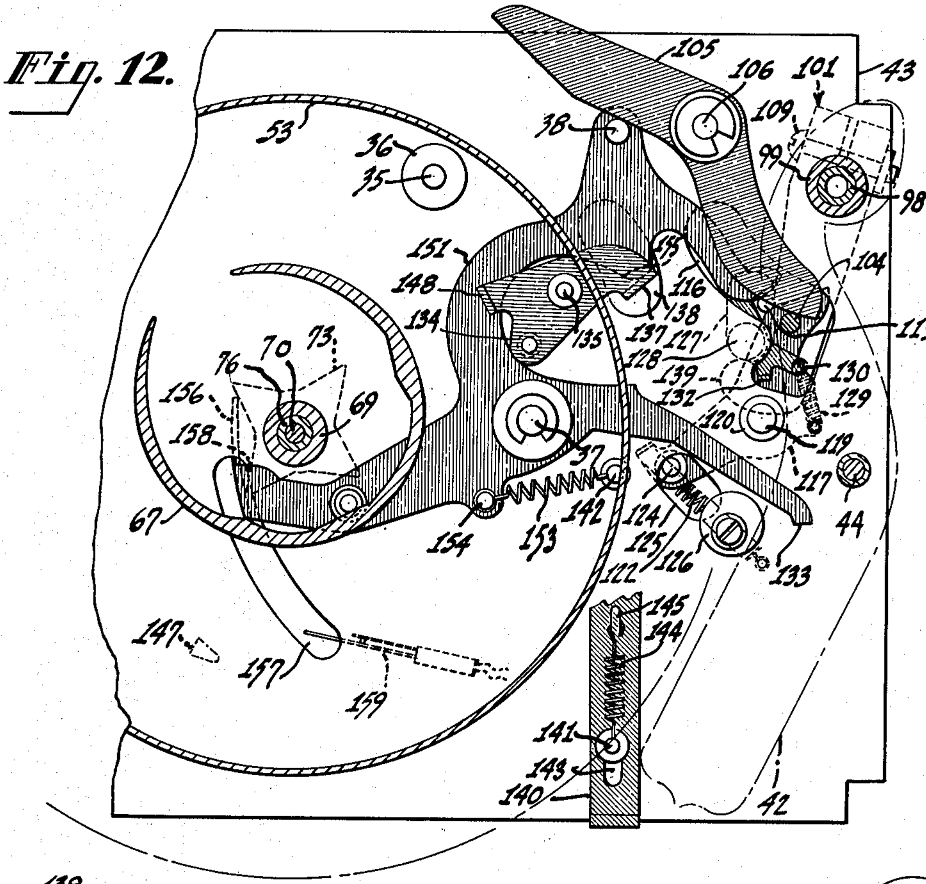
Figure 13:
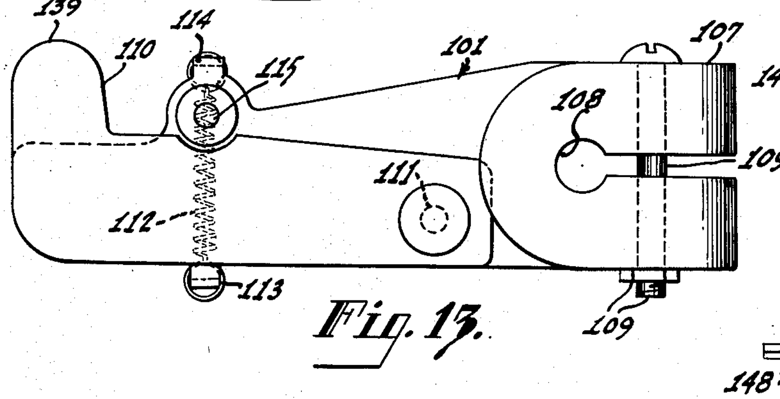
Figure 14:
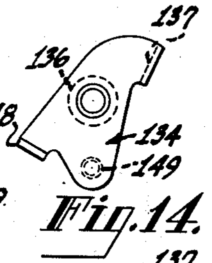
Figure 15:
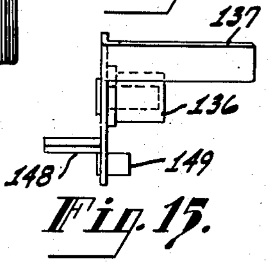
Figure 16:
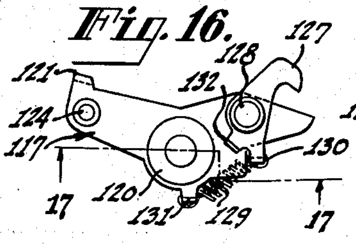
Figure 17:
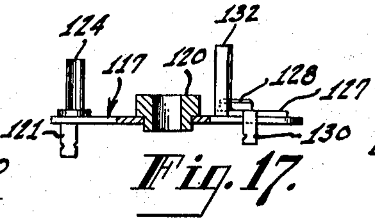

Figures 5 and 6 are similar plan views, partly in cross-section, of the center post of the mechanism of Figures 1, 2 and 3, taken substantially along lines 5—5 of Figure 3, to further illustrate the operational features of the invention and to show the relative positions of record supporting and separating elements of the present embodiment, in a normal inactive playing position and in a changing position respectively;

Figure 7 is a view in elevation, and partly in section, of the upper portion of the center post, also showing record supporting and separating elements positioned as shown in Figure 6;

Figure 8 is a sectional view taken along lines 8—8 of Figure 7 showing a planetary gearing arrangement for operating record supporting and separating elements of the mechanism;

Figure 9 is a plan view, partly in cross-section, of the record changer of Figures 1, 2 and 3, taken substantially along lines 9—9 of Figure 2, showing the arrangement of the elements of the mechanism in normal position for the record playing operation;

Figures 10 and 11 are similar plan views taken substantially along the same plane as Figure 9, showing portions of the mechanism of Figure 9 at the start of a changing cycle and during the cycle with the tone arm slightly raised;

Figure 11A is a plan view, on a reduced scale, of a detail modification of mechanism shown in Figures 9, 10 and 11;

Figure 12 is a further plan view taken substantially along the same plane as in Figure 9, similar to Figures 10 and 11, showing the same portions of the mechanism of Figure 9, with the tone arm moving toward its proper landing position, and with the record changing cycle about one-half completed;

Figure 13 is an enlarged plan view of a main trip lever forming part of the mechanism embodying the invention and shown in the preceding figures;

Figures 14 and 15 are plan and side views, respectively, of a further trip control element of the mechanism above referred to, showing further details thereof; and Figures 16 and 17 are plan and elevation views, respectively, of another element of the above mechanism for controlling the tone arm landing, Figure 17 being taken on the line 17—17 of Figure 16.

In accordance with the present invention an automatic phonograph record playing mechanism or record changer is provided which utilizes an enlarged turntable center post, whereby a plurality of records may be supported thereon adjacent their centers upon record supports contained therein, and periodically, at the completion of the playing of a record, by operation of the record changing cycle automatically, additional records are dropped successively on the turntable and played.

The lowermost record of the stack on the center post is automatically released by the record supports and slides down the center post to the turntable or the top of the previous record deposited thereon, so the stack on the spindle is transferred to a stack on the turntable. The remainder of the stack of records above the lowermost record is temporarily supported by separator elements which are coordinated in timed relation with said record supports. During the record changing cycle, the tone arm is automatically controlled until ultimately it is moved so that the pick-up head carried by the tone arm is in its landing position on the next record to be played.

The record changing and tone arm positioning mechanism operates automatically in cycles, a new cycle beginning at the conclusion of the playing of each record.

Referring to the drawings, and more particularly to Figures 1, 2, 3 and 9, there is shown an automatic record changer 40 having a casing or housing 41 and a tone arm 42 pivotally mounted above the casing. A motor board 43 or assembly base is suspended in the housing 41 by suitable mounting screws 44 and spacers 45 secured to the upper portion or top wall of the housing 41. An electric motor 46 has a motor spindle 47 which engages a rubber tire 48 on the lower portion of dual diameter idler wheel 49 for driving same. The dual diameter idler wheel 49 is pivotally mounted on an idler lever 50 on an idler wheel bearing stud 51, and the idler lever 50 is pivoted to the motor board by pivot 64. The upper portion of the dual diameter idler wheel 49 has a rubber tire 61 mounted thereon which engages the inner peripheral edge 52 of the turntable 53, said tire 61 being held in engagement with the peripheral edge 52 of the turntable by an idler lever tension spring 54 which connects the idler lever 50 to the motor board 43 as shown in Figure 9. The electric motor 46 is resiliently secured to the motor board 43 by suitable suspension means indicated at 66.

A control knob 55 for power and volume control, for example, is mounted on the housing 41 and extends to the exterior thereof in connection with a volume control potentiometer device 21, and a power switch 62 which may be manipulated for turning the electric motor "on" and "off."

The turntable 53 is unitary with the center post 56, which is of comparatively large diameter in the order of about 1½ inches. A center post cap 82 is secured to the upper portion of the center post 56 by elongated screws 63 (Figures 5 and 6) which are passed up through holes provided in the center post longitudinally on opposite sides thereof and are threadedly secured to said cap 82. Record supporting shelves 57 and record separator blades or knives 58 are supported within the center post 56 to be operated at appropriate times, as will hereinafter appear, for supporting and releasing of the records. A start or reject push button 59 is shown on the front of the phonograph housing in Figure 2 and is provided for initiating a new record changing cycle, if this is desired before the record changing cycle is automatically initiated by the movement of the tone arm at the completion of the playing of a record.

Figure 4:
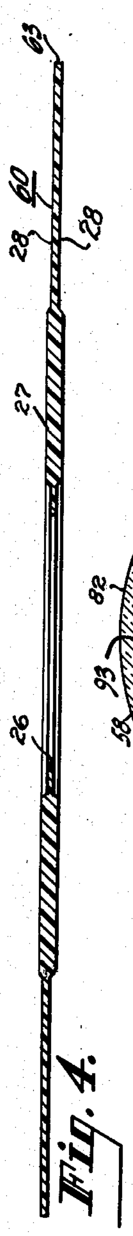
Figure 4 is a cross-sectional view of a small diameter, slow speed phonograph record of the type especially adapted for use with the phonograph record playing mechanism of the present invention and as shown in Figures 1, 2 and 3.

A suitable phonograph record, as hereinbefore referred to, for use with the record changer mechanism is shown in Figure 4 in cross-section and on enlarged scale. The record is provided, as indicated, with a flanged or double-recessed inner opening 26 adapted to fit on the center post 56 with a slide fit, a thicker hub portion 27 surrounding the opening, and a thin outer peripheral portion 63 extending from the hub portion to provide recording surfaces 28 on either side. The use of these features of the record, which is slightly less than seven inches in diameter, will hereinafter be described in connection with the operation of the complementary record changer mechanism.

Referring more particularly to Figures 2, 3 and 9, a cycling cam 67 provided on the under side of the turntable is shown unitary with the turntable 53 and the center post 56. The turntable is positioned on the automatic record changer phonograph and extends through and partially lies in an opening 68 of the phonograph housing 41. A bushing 69 is secured to the motor board 43 and extends above the upper level of the housing 41, and is shown in cross-section above the cam 67 and in elevation below the cam 67 (Figure 2). A vertical central shaft 70 supported within the center post 56 has a planetary gear 71 secured on the upper end thereof by suitable means, such as a screw 72. The shaft 70 extends downwardly through the center post 56 and through the bushing 69, thence through a spacer bushing 76*a*, and a star wheel 73. The star wheel which is provided with a hub or integral bushing 74, is secured by means of set screws 75 to the lower end of the gear shaft 70. It will further be seen that the planet gear 71 is held against a bushing or sleeve 76 which fits about the gear shaft 70. The lower end of sleeve 76 engages the top face of the star wheel 73 and the hub 74, which are secured to the lower end of the gear shaft 70, thereby holding the turntable firmly in rotatable position in relation to the motor board 43.

The rubber tire 61 on the upper portion of the idler wheel 49 engages the inner peripheral surface 52 (Figure 2) of the turntable 53. A thrust bearing 77 permits the turntable-center post unit 53—56 to rotate on the upper end of the bushing 69, as may be clearly seen in Figure 2.

When energized by operation of the control knob 55 to turn "on" the operating current, the electric motor 46 drives the freely rotatable turntable-center post unit 53—56. In normal playing operation, the rotation of the turntable also permits the free rotation of the star wheel 73 and its gear shaft 70, with the main gear 71 on the opposing end thereof. Therefore, rotation of the turntable also permits the main gear 71 to rotate simultaneously therewith so that there is no movement normally between the main gear and any of the components within the center post 56. During normal playing of the phonograph, the star wheel 73 and its associated gear shaft 70 rotate with the turntable unless the star wheel is prevented from rotation as is the case during the record changing operation hereinafter described.

During normal playing of the phonograph, it is necessary that the star wheel rotate with the turntable since any relative motion between the star wheel 73 and the turntable-center post 53—56 would cause movement of the parts within the center post, such as movement of the record supporting shelves 57.

The construction and assembly of the elements within the center post will now be described primarily in relation to Figures 2, 3, and 5 to 8 inclusive. It will be noted that throughout the drawing figures like reference characters are used to designate the same or like parts.

A pair of planetary pinions 78 each have a hub portion 79 on the lower side thereof which in turn are each provided with a central bearing socket 80 coaxial with the pinion. A stud 81 by force fit of a knurled portion 83 in the body of the center post is secured to the center post at diametrically opposite sides of the shaft 70.

The planetary pinions 78 are thereby permitted to rotate freely on the studs 81 while the teeth of the pinions are in engagement with the teeth of the planet gear 71 on the shaft 70. An eccentric cam portion 84, cylindrical in shape, is formed on the upper portion of each of the pinions 78, being thereby axially eccentric with the studs 81. The pair of record supporting shelves 57 have rectangular or square openings 85 formed therein so that the cam portion 84 may be inserted therethrough for eccentric movement therein.

The upper portions of the cams 84 have square shoulders 86 formed thereon to receive and connect with separator blades or knives 58. Each of the separator knives has a square shaped opening therein complemental to the square shoulders 86 for properly positioning the separators on the cam portions 84. The record supporting shelves 57 each have a flat lower portion which rides on a seat 87 formed in the center post 56, while a shoulder 88 formed on the upper portion of each of the record supporting shelves slidably engages the lower face or surface of an adjacent separator blade or knife 58 when the planetary pinions are rotated. The motion of each record supporting shelf 57 is reciprocatory in that the record supports both simultaneously move inwardly, and then move outwardly, while the record separator blades 58 have a rotary motion.

A compression spring 89 is compressed into recesses 90 in the record supporting shelves 57. The spring therefore always urges or biases the record supports outwardly, away from each other, so that a space 91 normally exists in the square shaped openings 85 between the cam portions 84 and each record supporting shelf 57 on the side of the cam portion opposite the spring 89. The cam portions 84 normally forcibly engage the inner surface nearest the spring 89 of the square shaped openings 85.

The spaces 85 are also provided so that the record supporting shelves 57 may, at any time, be repressed inwardly against the action of compression spring 89. This provides for the ready removal of the records manually from the turntable by sliding them upwardly along the center post, since the contact of a record against the record support included lower cam-shaped surfaces causes compression of the spring 89. This permits removal of the record support as an obstruction to the upward passage of records along the center post.

The cap 82 has a leaf spring 92 (Figure 8) secured thereon by a screw 93. The spring 92 engages the upper portion of the square shoulders 86 which may be peened at 34 (Figure 8), to lock the separator knives 58 on the cam portion 84. When the cap 82 is secured into position on the center post 56 by screws 63 (Figure 5), the planetary pinions are then in engagement with the main gear 71. Rotation of the main gear 71 causes rotation of the pinions 78. The two eccentric cam portions 84 rotate in the openings 85 of the record supporting shelves 57, and under influence of the spring 89 cause a reciprocatory motion of the record supporting shelves 57 and the record separator knives 58 when the gear 71 is rotated.

When the phonograph is in normal playing position, and the main gear 71 is stationary in relation to the center post 56, the record supporting shelves 57 are in their extended position as shown in Figures 2 and 5. At the proper time during the record changing cycle, the star wheel 73 is prevented from rotating while the turntable-center post 53—56 continues to rotate, therefore providing relative motion between the stationary planet gear 71, which is connected to the star wheel shaft 70, and the moving planetary pinions 78.

As the pinions continue to rotate, the record supporting shelves 57 are withdrawn or retracted to the position shown in Figures 6 and 7, and the record separator blades or knives are rotated into the recesses or spaces 33 between the inner peripheral flanged edges of adjacent records so that a portion thereof will extend beyond the center post to support the stack of records above the lowermost record of the stack.

Normally, the records are held by the record supporting shelves 57. As the planet gear 71 rotates, the record separator blades have their inclined, or leading edges 94 slide or rotate into the space 33 between adjacent records provided at the flanged inner edges of the center openings in the various records.

As the record supporting shelves 57 are retracted during the record changing operation, the lowermost record is permitted to slide down the center post 56 until it engages the turntable per se or the records on the turntable. The remainder of the unplayed records on the stack are then supported by the record separating blades 58 as shown in Figure 7. Continued rotation of the planetary pinions 78 about the planet gear 71 causes the record supporting shelves to be urged outwardly to the record supporting position as shown in Figures 2 and 5 so that as the single revolution of the main gear 71 is completed, the record separator blades 58 are withdrawn to their normal inactive position as shown in Figure 5 and the remainder of the stack of records moves downwardly a short distance to the record supporting shelves 57.

From the foregoing, it will be seen that during the normal record changing operation, the star wheel 73 is held stationary while the turntable-center post 53—56 continues to rotate, thereby providing means for operating the record changer mechanism per se at the appropriate time during the record changing cycle. The means for restraining the movement of the star wheel 73 at the proper time will be explained in detail in relation to the operation of a main or director lever hereinafter.

The tone arm assembly will be described with particular reference to Figures 3 and 9. The tone arm 42 carries a sound-reproducing or phonograph pick-up device 95 at the free end thereof. The pick-up device is provided with a suitable stylus 96 for engaging the sound groove of the record. The opposite end of the tone arm is provided with a horizontal pivot pin 97 which pivotally connects the tone arm to a vertically mounted tone arm post 98, representing any suitable arrangement permitting of raising and lowering the tone arm.

To permit lateral movement of the tone arm about the axis of the vertically mounted post 98, a tone arm bushing 99 is secured to the motor board 43 and extends through an opening in the housing 41, so that the tone arm may be mounted externally of said housing. The tone arm post 98 has a shoulder which rests on the upper portion of the tone arm bushing 99. The post 98 extends through the bushing 99 below the motor board 43 and passes through a spacer 100 which spaces a trip lever 101 from the motor board 43.

The trip lever 101 is secured to the lower end of the tone arm post 98. The tone arm post is free to rotate within the bushing 99 so that lateral movement of the tone arm may be had as the stylus 96 follows the sound grooves, and for resetting the tone arm at the conclusion of the playing of each record. A suitable counterweight (not shown) if desired, may be mounted in the rear end of the tone arm adjacent to the pivot pin (Figure 3) at the rear thereof, in any convenient manner. A spring 102 secures the rear end of the tone arm to a lug 103, the purpose of the spring being to assist the counterweight in properly balancing the tone arm to obtain the desired stylus pressure.

A tone arm elevating pin 104 is rigidly secured to the tone arm as shown in Figure 3, while the free end of said pin 104 is adapted to be engaged by the tone arm elevating lever 105 to raise or lower the tone arm as said elevating lever pivots about the lever pivot stud 106. The stud 106 is secured to the motor board 43. The tone arm elevating lever is movable in response to the pin 38 carried by a director or main lever 151, which main lever operates during the record changing cycle as will hereinafter appear.

The trip lever 101, on an enlarged scale in Figure 13, is shown secured to the tone arm post 98 in Figure 3. The trip lever has a bifurcated U-shaped portion 107 adapted to receive the tone arm post 98 through an aperture 108. A nut and screw 109 engage opposing sides of the bifurcated U-shaped portion 107 and compress said sides so that they grip the tone arm post 98 in the aperture 108. The trip lever is made in this manner to provide a convenient clamping means for securing the trip lever 101 to the tone arm post 98, and also for holding the trip lever positioned as shown in Figure 3.

The lower portion of the trip arm has a trip lever pawl 110 pivotally mounted by a pivot pin 111 to the trip lever 101. A tension spring 112 is connected between a pair of lugs 113 and 114. Lug 114 is secured to the portion of the trip lever 101 which is rigidly connected to the tone arm post 98. Lug 113 is formed as part of the trip lever pawl 110 to provide a resilient pressure member for engaging the trip pawl lug 137 of the trip pawl 134. A tone-arm control pin or stud 115 is secured to the trip lever 101 to provide a rigid connection with tone arm post 98. The control pin or stud 115 extends upwardly through an L-shaped opening 116 in the motor board 43.

The tone arm landing or return lever 117 (Figure 16) which is pivotally connected to the lower side of the motor board is one of the elements which engages the trip lever tone arm control pin or stud 115 for restoring the tone arm to its landing position. The main lever tone arm control end or finger 118 (Figure 9) is a portion of the main lever 151 pivotally mounted above the motor board for restoring the tone arm to its outer position. The tone arm control end or finger 118 engages the control pin 115 for resetting the tone arm by urging it counterclockwise since it is a part of the main lever 151, as shown in Figure 11. This moves the tone arm from an inner diameter of the record to an outer diameter of the record near the beginning of each record changing cycle.

The landing or return lever 117 shown in detail in Figures 16 and 17, is pivotally connected to the lower side of the motor board 43 by a stud 119 which fits in a bushing 120. A lug 121 extends downwardly from the landing lever 117, and a spring 122 connects said lug 121 to the pin 123 (Figure 3) which latter pin is secured to the motor board. The spring 122 urges the landing lever 117 in a counterclockwise direction. A landing lever positioning pin 124 extends upwardly from the landing lever 117 through an opening 125 (Figure 9) in the motor board and engages a landing lever adjustment means 126.

This adjustment means is a cam secured to a stud having a slot therein for rotation of the cam, with said stud being pivotally connected to the upper surface of the motor board 43 so that the cam may engage the landing lever positioning pin 124, for moving the landing lever 117 in one direction or the other in response to the movement of the cam. This adjustment means permits the landing lever to be rotated so that the control stud 115 carried by the trip lever 101 may engage the landing lever to determine the exact position for release of the tone arm by the landing lever pawl 127 which is pivotally connected to the landing lever 117 by the stud 128.

A spring 129 connects lug 130 connected to the landing lever pawl 127, with the lug 131 which urges said pawl 127 in a clockwise direction about the stud 128. A landing lever pawl lug 132 extending upwardly from the pawl 127 protrudes through the L-shaped opening 116 in the motor board and is engageable by the main lever pawl release 133 so that when the main lever 151 is completely released by release of the cam pin 152 from the cycling cam 67, the pawl release 133 will engage the pawl lug 132 to urge the landing lever pawl 127 out of the path of the tone arm control stud 115 on the trip lever, so that the tone arm may move inwardly in response to the stylus 96 of the pick-up device 95 following the sound groove of the record. The main lever pawl release 133 may be seen engaging the landing lever pawl lug 132 in Figure 9, while the control stud 115 is free to move, and therefore permits movement of said tone arm in a normally free manner.

The trip pawl 134 is shown in detail in Figures 14 and 15. The trip pawl 134 is mounted on the upper surface of the motor board 43 by a stud 135 which extends through a bushing 136. A trip pawl lug 137 extends downwardly through an opening 138 so that said lug 137 may be engaged by the free end 139 of the trip lever pawl 110 in response to the movement of the tone arm trip lever 101 as the tone arm moves inwardly following the sound groove of the record. The free end 139 of the trip lever pawl 110 engages the trip pawl lug 137 as the stylus of the pick-up device reaches a common diameter groove in the record, to urge the trip pawl lug 137 in a counterclockwise direction. A start-reject bar or rod 140 is slidably mounted on the upper surface of the motor board by means of studs 141 and 142 operating in conjunction with guide slots 143. A spring 144 is connected from a stud 141 to a lug 145 on the start-reject bar 140 to normally urge the bar against the operating push button 59. The start-reject bar actuates the trip pawl 134 in the same manner that the trip pawl 134 is operated by the free end 139 of the trip lever pawl 110.

A tripping boss 147 is formed on a lower face or surface of the turntable, and is adapted to be engaged by the boss engaging lug 148 which extends upwardly from the trip pawl 134. The lug 148 on the trip pawl 134 may be moved into the path of the tripping boss 147 by either the trip lever pawl 110 of the tone arm actuated trip lever 101 or the manually operable start-reject bar 140 when the button 59 is depressed.

Figure 9 shows the tripping boss 147 very close to the boss engaging lug 148 but it is definitely in a position to pass said boss engaging lug 148, since this is substantially the normal position of the trip pawl when the phonograph is in playing condition. When the trip pawl 134 is moved counterclockwise by the trip lever pawl 110, the boss engaging lug 148 is moved into the path of the tripping boss 147. It is particularly pointed out that as the tone arm moves in response to the stylus of the pick-up device moving in the sound groove of the record, the trip lever pawl 110 ultimately urges the trip pawl 134 in a counterclockwise direction.

It will therefore be seen that the only lateral pressure required on the stylus point is sufficient pressure to cause the tone arm movement to urge the trip pawl in a counterclockwise direction whereupon the tripping boss 147 engages the lug 148 on the trip pawl 134. When the trip pawl 134 is so moved, the tripping boss 147 (Figure 10), which is a part of the turntable and driven by the motor, urges the trip pawl lug 137 in a counterclockwise direction until the trip pawl stud 149, which extends downwardly from the trip pawl 134, is urged against the cam surface 150. This causes the main lever 151 to move in a clockwise direction until the cycling cam stud 152, which is secured to the main lever 151 and extends upwardly therefrom, is urged into the opening between the ends of the cycling cam 67.

By the time the tripping boss 147 is moved past the boss engaging lug 148 on the trip pawl 134, the main lever 151 is then rotated sufficiently to cause the cycling cam 67, which moves in a clockwise direction, to pick up the cycling cam stud 152. The tension spring 153 has one end secured to the stud 142 which is fastened to the motor board, while the other end of the spring 153 is secured to the pin 154 on the main lever 151. The spring 153 constantly urges the main lever 151 in a counterclockwise direction about the pivot stud 37. Consequently, after the cycling cam pin 152 is picked up by the cycling cam 67, the influence of spring 153 maintains the cycling cam pin 152 against the inner camming surface of the cycling cam 67 throughout the remainder of the rotating of the cycling cam until the opposite end of the cycling cam is reached by the cycling cam pin 152. At this time, the main lever 151 is restored to normal under influence of the spring 153 and is urged in a counterclockwise direction until it engages the limiting means 36 which is secured to the motor board 43 by the stud 35.

As the main lever 151 is moving through its cycle under influence of the cycling cam 67, the trip pawl resetting shoulder 155 (Figure 12) engages the upper portion of the trip pawl lug 137 as is shown in Figure 11. The clockwise movement of the main lever 151 likewise causes clockwise movement of the trip pawl 134 until the trip pawl is restored to a normal position substantially as in Figure 9.

The main lever 151 has an actuating or star wheel engaging finger 156 (Figures 2 and 9) which extends downwardly through a slot 157 in the motor board to contact the star wheel 73 at the appropriate time in the cycle. The main lever star engaging finger 156 may be seen in a side view in Figure 2. In Figure 12, the star engaging finger 156 is seen engaging one prong 158 of the star wheel 73. As soon as the star engaging finger moves into the path of one of the prongs of the star wheel 73, and engages said finger 156, said finger immediately causes the star wheel to become stationary while the turntable continues to rotate.

The prong 158 of the star wheel 73 engages the finger 156, and the main lever 151 continues to rotate clockwise, and then reverses its direction and rotates counterclockwise, since it is part of the main lever 151, while the prong 158 slides on the finger 156 until said finger 156 moves outwardly past the prong 158, at which time the star wheel 73 is released. One of the prongs 158 of the star wheel 73 engages the finger 156 for a period of time sufficiently long to permit the full 360 degrees rotation of the planetary pinions 78 about the main or planet gear 71, which gear is connected to the same shaft as the star wheel 73, as has been previously explained.

Referring now to Figure 11A, it will be noted that the tone arm elevating lever 105 may be provided with dash pot control means, whereby the tone arm may be lowered smoothly and slowly in certain instances, where desirable. To this end, the tone arm elevating lever 105 is provided with a suitable extension or control arm 161, which may be suitably riveted or otherwise secured thereto as indicated, and extends substantially as a continuation of the lever for pivotal connection with an operating rod 162 of a dash pot 163.

The dash pot may be mounted adjacent to the tone arm elevating lever by any suitable means, such as an integral bracket 164, and is provided with the usual dash pot plunger 165, connected with the operating rod 162. The arrangement is such that, as the tone arm is elevated, movement of the elevating lever is substantially unimpeded, whereas, upon lowering, the dash pot is arranged to provide a braking effect and to permit the tone arm to be lowered smoothly and at a predetermined rate into the playing position with the stylus engaging the record.

Likewise, the actuating or star engaging finger 156 may be utilized to actuate any desired switch means during the playing or the cyling intervals or both by placing the operating element thereof in the path of movement of the finger. By way of example a switch 159 is shown in such an arrangement and may be used for muting the pick-up output or for any other purpose. It is shown in the open position with the finger 156 retracted for the playing operation and is closed when the finger moves to contact the star wheel during the changing cycle.

The operation of the mechanism, briefly, is as follows: Records are placed on the separator shelves 57 protruding from either side of the turntable center post 56 as shown, for example, in Figures 1 and 2. The operating motor is energized by any suitable alternating-current source, and the start-reject button 59 is depressed, causing the start-reject slide 140 to move inwardly, engaging the trip lever pawl 137 and causing it to move into the tripping position. As the turntable rotates, the tripping boss 147, extending from the under side of the turntable, contacts the end of the trip pawl 148.

The tone arm then rises as the turntable continues to rotate. This is caused by the fact that the turntable carries the trip pawl 148 along for a short distance, whereupon the trip pawl pin or stud 149 applies force against the main lever 151 in opposition to tension spring 153. This force continues to be applied until the stud 152 on the lever 151 has been forced through the slot and into the cycling cam 67.

The end 156 of the main or director lever 151 extending below the motor board 43 moves away, allowing the switch 159 to close. At the same time, the stud 38 pushes the tone arm elevating lever 105, which in turn raises the tone arm through pressure exerted by contact with the tone arm elevating pin 104.

The tone arm then moves outwardly, away from the record, for the reason that the end 118 of the main lever 151 contacts the stud 115 on the trip lever 101, starting the tone arm on its outward movement. The stud 115 on the trip lever contacts the tone arm return lever 117, pushing it outwardly against the tension of spring 122. As the tone arm reaches its outermost position, it is locked in position by the latch 127 clamping the stud 115 on the end of the trip lever.

During the foregoing operation, the separator knives 58 separate the lower record from the stack and allow the record to drop to the turntable. This is for the reason that, while the tone arm is moving outwardly, the end 156 of the main lever 151 extending below the motor board 43 contacts and prevents the star wheel 73 from rotating.

The turntable continues to rotate and the star wheel 73 and gear shaft 70 remain stationary. The two small planetary pinions 78, mounted in the upper end of the center post, rotate around the planet gear 71 on the upper end of the star wheel or gear shaft 70.

The eccentric or cam portions 84, extending from the upper ends of the two planetary pinions 78, revolve in slots in the supporting shelves 57. This produces the necessary action to cause the shelves to move in against the tension of the compressional spring 89. As the record supporting shelves recede within the confines of the center-post housing, the record separator knives 58, mounted above each record supporting shelf, separate the lower record of the stack and support the remaining stack while the lower record drops to the turntable.

The tone arm then moves in for landing in the outer groove of the record. This action is effected by reason of the fact that, as the main lever 151 continues to move toward the out of cycle position, the end 118 of the main lever retains contact with the stud 115 on the trip lever 101. This contact stabilizes the inward movement of the tone arm 42, which is being pushed in by the tone arm return lever 117. The inward movement of the tone arm is stopped directly above the landing position, due to the stud 124 on the tone arm return lever coming in contact with the landing lever eccentric stud 126. The tone arm lowers the stylus to the record when the stud 38 on the main lever 151 continues to contact the tone arm elevating lever 105, and lowers the stylus onto the starting groove of the record. As the turntable completes one revolution, the stud 152 on the main lever is pulled through a slot in the cycling cam 67 by the force produced by the tension spring 153.

While the stud 152 on the main lever slides through the slot in the cam 67 and assumes the out-of-cycle position, the end of the main lever 151 contacts the projection 132 and unlatches the pawl 127 on the tone arm return lever 117. The end 156 of the main lever below the motor board moves away from the star wheel 73 and opens the muting switch 159.

The record then plays, that is, the transducer or pick-up device is actuated by the recording in the record grooves and the signal therefrom is applied to the output connections (not shown) as provided therefor. When the stylus has engaged the last groove and enters the tripping groove, completing the playing of the selection, the trip lever 101 carries the trip lever pawl 110 into position for engagement with the lug 148 on the trip pawl 134 which engages the tripping boss 147 on the under side of the turntable 53. This contact between the tripping boss or stud 147 and the trip lever pawl 134 starts another change cycle, and the next record is moved into position for playing as hereinbefore described.

Summarizing the various factors and advantages of the record changer mechanism of the present invention, it will be seen that two oppositely positioned and inwardly retractable shelves are located in the turntable spindle. In direct association are two outwardly rotatable blades or knives spaced at a definite distance above the shelves. The design is such that the shelves normally extend beyond the periphery of the spindle, and with the blades or knives are normally housed within the periphery of the spindle. The cycling operation causes the blades to rotate out beyond the outside diameter of the spindle just before the shelves are retracted to within that diameter. To complete the cycle, the shelves move back to their normal extended position just before the blades are rotated back to their normal retracted position.

The center area of the record about the center hole is depressed on either side of the record, so that when two records are stacked together an air space is provided between them, that is, the dimensions of the depressed area and the spacing between the record changer shelf and blade are such as to bring the center of the blade in line with the center of the air space provided between the records. This design offers a distinct advantage in that the records are not knived or otherwise separated, or even touched by the blade during the selecting operation.

The aforementioned shelves are held outwardly by a spring and their lower portion is shaped so as to be contained within the body of the spindle. This design causes the shelves to be cammed inwardly when the records are removed from the turntable. The large diameter spindle and record center hole result in easy loading of the changer, and the retractable shelves result in easy unloading.

The pick-up unit, tone arm and tripping mechanism are designed to be consistent with the requirements of the record. Of particular importance is the tripping mechanism, as the power required to put the record changer into cycle does not require any force between the reproducing stylus and the record groove. The design is such that a small substantially frictionless lever is moved by the inward motion of the tone arm to a specific position where a lug on the turntable picks up the small lever and causes it to cam the mechanism into cycle. The record changer mechanism is of unit design, thus permitting the same unit to be used in substantially all styles and types of cabinets.

I claim as my invention:

1. An automatic phonograph record playing mechanism comprising a rotary turntable, a center post of relatively large diameter with respect to and rotatable with said turntable, said center post being adapted to support individual and stacks records above said turntable and to release said records for individual sequential positioning on said turntable, a pivotally mounted tone arm, a transducer device carried thereby having a stylus element adapted to engage and follow a record groove, and a cyclic record changing and tone arm positioning mechanism including complementary rotary blade and retractable shelf means carried by said center post for supporting and separating said records, and combined planetary gear and eccentric cam means interconnecting said blade and shelf means and disposed within said center post for jointly operating said record supporting and separating means.

2. An automatic phonograph record playing mechanism comprising a rotary turntable, a center post of relatively large diameter with respect to and rotatable with said turntable, said center post being adapted to support individual and stacked records above said turntable and to release said records for individual sequently positioning on said turntable, a pivotally mounted tone arm, a transducer device carried thereby having a stylus element adapted to engage and follow a record groove, and a cyclic record changing and tone arm positioning mechanism including complementary rotary blade and retractable shelf means carried by said center post for supporting and separating said records, combined planetary gear and eccentric cam means interconnecting said blade and shelf means and disposed within said center post for jointly operating said record supporting and separating means, means including a star wheel and shaft connected to said planetary gear and cam means operable for driving said planetary gear and cam means in timed relation to movement of said tone arm, and means including a cam carried by the turntable and a follower element controlled by movement of said tone arm for initiating and powering operation of a record changing cycle.

3. An automatic phonograph record changer mechanism comprising in combination, a rotary turntable having a center post of relatively large diameter with respect to and rotatable with said turntable, a pair of rotary flat blades pivotally mounted to rotate from a position within to a position extending outwardly from said center post, a pair of record supporting shelves retractable from a position extending outwardly of to a position within said center post, said shelves having cam portions for facilitating the removal of records from said center post, planet gear means within said center post having a control shaft extending substantially axially thereof, and planetary pinions rotatable about said planet gear means within the center post and having said blades eccentrically mounted thereon and interconnecting said shelves for simultaneously actuating said rotary blades and record supporting shelves in unison and in predetermined sequence and relation during a record changing cycle.

4. An automatic phonograph record changer mechanism comprising in combination, a rotary turntable having a center post of relatively large diameter with respect to and rotatable with said turntable, a pair of rotary flat blades pivotally mounted to rotate from a position within to a position extending outwardly from said center post, a pair of record supporting shelves retractable from a position extending outwardly of to a position within said center post, said shelves having cam portions for facilitating the removal of records from said center post, planet gear means within said center post having a control shaft extending substantially axially thereof, a tone arm device for said mechanism, means responsive to movement of said tone arm for stopping said control shaft during a record changing cycle and for permitting said shaft to rotate with the turntable during a record playing interval, and planetary pinions having said blades mounted thereon and connecting said shelves and being rotatable about said planet gear means within the center post for simultaneously actuating said rotary blades and record supporting shelves in unison and in predetermined sequence and relation during a record changing cycle.

5. An automatic phonograph record changer mechanism comprising in combination, a rotary turntable having a center post of realtively large diameter with respect to and rotatable with said turntable, a pair of diametrically oppositely disposed rotary flat blades pivotally mounted to rotate from a position within to a position extending outwardly from said center post in a common plane substantially normal to the axis of rotation of the turntable, a pair of record supporting shelves disposed below said plates and retractable from a position extending outwardly of to a position within said center post, said shelves having cam portions below the record supporting portions thereof for facilitating the removal of records from said center post, planet gear means within said center post having a control shaft extending substantially axially thereof below the turntable, a tone arm device for said mechanism, means responsive to movement of said tone arm in a predetermined region for stopping said control shaft during a record changing cycle and for permitting said shaft to rotate with the turntable during a record playing interval, and planetary pinions rotatable about said planet gear means within the center post having eccentric cam portions thereon connected with said blades and opertaively associated with said shelves for simultaneously actuating said rotary blades and record supporting shelves in unison and in predetermined sequence and relation during a record changing cycle.

6. In an automatic phonograph record changer, the combination with a rotary turntable, of a center post rotatable with and on said turntable, said center post being of relatively large diameter and adapted to support a plurality of small diameter flat-disc records having complementary relatively large center openings with respect to said turntable for individual sequential release and positioning thereon, a tone arm having a transducer device and stylus means therefor adapted to follow a record groove, and a cyclic record changing and tone arm positioning mechanism, said mechanism including means carried by and within said center post for supporting and separating said records, planetary gear and cam means disposed within said center post and interconnecting said supporting and separating means for simultaneously operating said record supporting and separating means, and operating and control means connected to said planetary gear and cam means and operable externally of said center post for causing said planetary gear and cam means to be driven in timed relation to movement of said tone arm during a record changing cycle.

7. An automatic phonograph record changer as defined in claim 6, wherein said operating and control means includes a cycling cam carried by said turntable, a main lever having pin means engageable with said cycling cam to cause said main lever to operate through a record changing cycle, means responsive to movement of said main lever to cause the transducer device and said tone arm to be removed from one record and deposited at the landing position of a succeeding record, a tripping lug carried by said turntable, a trip pawl engageable with said tripping lug for initially causing movement of said main lever and engagement of pin means with said cycling cam, and means carried by said tone arm for urging said trip pawl into the path of said tripping lug to initiate said record changing cycle, whereby a cycling operation is effected without the application of any appreciable force to the stylus means of the transducer device.

8. Automatic phonograph record playing mechanism for slow-speed records of the flat-disc type comprising in combination, a rotary turntable element having a central record storage spindle extending axially from one face thereof, said spindle having a diameter relatively large with respect to the diameter of said turntable element and providing a housing, record separator means comprising radially retractable blade elements and radially retractable shelf elements mounted within said housing, means for operating said record separator means including a central shaft concentric within said spindle, said shaft being rotatably associated with said record separator means and operable upon being held stationary with respect to said spindle to cam said record separator means through a change cycle operation, and shaft stopping means upon limited engagement with said shaft effecting operation of said separator means during a limited rotational movement of said turntable substantially not greater than one revolution of said turntable.

9. An automatic phonograph record mechanism comprising in combination, a rotary turntable having a center post of relatively large diameter with respect to and rotatable with said turntable, a pair of flat blades mounted to move from a position within to a position extending outwardly from said center post, a pair of record supporting shelves retractable in complementary relation to movement of said blades from a position extending outwardly of to a position within said center post, said shelves having cam portions for facilitating the removal of records from said center post, a rotatable control shaft within the center post extending substantially axially thereof, a tone arm for stopping rotation of said control shaft during a record changing cycle and for permitting said shaft to rotate with the turntable during a record playing interval, and means within the center post operatively connecting said control shaft with said blades and shelves to move said blades and shelves in complementary relation to feed records from the post to the turntable in response to stopping of said control shaft.

10. Automatic phonograph record playing mechanism for slow speed records of the flat disc type comprising in combination, a rotary turntable, a center post of relatively large diameter with respect to and rotatable with the turntable, said center post providing a housing and being adapted to support individual and stacked records above the turntable and to release said records for individual and sequential positioning on said turntable, a pivotally mounted tone arm, a transducer device carried by said tone arm having a stylus element adapted to engage and follow a record groove, a cyclic record changing and tone arm positioning mechanism including complementary retractable blade and shelf means carried by said center post for supporting and releasing said records, rotatable shaft means in said housing connected with said blade and shelf means for effecting operation thereof upon relative movement of said turntable and shaft means, tripping means for said mechanism responsive to termination of a playing operation of a record for initiating a record change cycle, and means connected with said mechanism for stopping rotation of said shaft means during said record change cycle.

11. Automatic phonograph record playing mechanism for slow-speed records of the flat-disc type comprising in combination, a rotary turntable element having a central record storage spindle extending axially from one face thereof, said spindle having a diameter relatively large with respect to the diameter of said turntable element and providing a housing, record separator means comprising retractable blade elements and radially retractable shelf elements mounted within the housing of the turntable spindle, cam means for effecting operation of said record separator means during a limited rotational movement of said turntable substantially not greater than one revolution, cam engaging means operable in response to a tripping operation of said mechanism upon completion of a record playing interval to engage said cam means during said limited rotational movement of said turntable and effectuate operation of said record separator means by said cam means, said cam means comprising a circular cam element carried by the turntable providing a cam surface rotatable about the axis of said turntable, said cam engaging means including a main lever, a cam follower element carried by said main lever for engaging said cam element in response to a tripping operation of said mechanism upon completion of a record playing interval, a planet gear in the record storage spindle having a shaft extending axially thereof and being rotatable with said spindle, means including a finger carried by said main lever for stopping rotation of said shaft and planet gear, and a pair of planetary pinions carried by said spindle, and eccentric cam means having said blade elements mounted thereon and operated thereby for rotating said blade elements and moving said shelf elements in unison in predetermined relation for effecting a record changing operation.

12. Automatic phonograph record playing mechanism for slow-speed records of the flat-disc type comprising in combination, a rotary turntable element having a central record storage spindle extending axially from one face thereof; said spindle having a diameter relatively large with respect to the diameter of said turntable element and providing a housing, record separator means comprising retractable blade elements and radially retractable shelf elements mounted within the housing of the turntable spindle, cam means for effecting operation of said record separator means during a limited rotation movement of said turntable substantially not greater than one revolution, cam engaging means operable in response to a tripping operation of said mechanism upon completion of a record playing interval to engage said cam means during said limited rotational movement of said turntable and effectuate operation of said record separator means by said cam means, a pair of planetary pinions, eccentric cam elements operatively connected with said blade and shelf elements, and a planet gear element operatively connected with said pinions the rotation of which is controlled in accordance with differing conditions of operation of said mechanism, said cam means including a cam element rotatable with and about the axis of the turntable, a cam follower element therefor, and means actuated by said cam follower element for imparting a force to said planet gear element.

13. Automatic phonograph record playing mechanism for slow-speed records of the flat-disc type comprising in combination, a rotary turntable element having a central record storage spindle extending axially from one face thereof, said spindle having a diameter relatively large with respect to the dimeter of said turntable element and providing a housing, record separator means comprising retractable blade elements and radially retractable shelf elements mounted within the housing of the turntable spindle, cam means for effecting operation of said record separator means during a limited rotational movement of said turntable substantially not greater than one revolution, cam engaging means operable in response to a tripping operation of said mechanism upon completion of a record playing interval to engage said cam means during said limited rotational movement of said turnable and effectuate operation of said record separator means by said cam means, a pair of planetary pinions, eccentric cam elements operatively connected with said blade and shelf elements, and a planet gear element operatively associated with said pinions, the rotation of which is controlled in accordance with differing conditions of operation of said mechanism.

14. Automatic phonograph record playing mechanism for slow-speed records of the flat-disc type comprising in combination, a rotary turntable element having a central record storage spindle extending axially from one face thereof, said spindle having a diameter relatively large with respect to the diameter of said turntable element and providing a housing, record separator means comprising retractable blade elements and radially retractable shelf elements mounted within the housing of the turntable spindle, a pair of planetary pinions, eccentric cam elements operatively connected with said blade and shelf elements, a planet gear element operatively associated with said pinions, the rotation of which is controlled in accordance with differing conditions of operation of said mechanism, cam means for effecting operation of said record separator means during a limited rotational movement of said turntable substantially not greater than one revolution, cam engaging means operable in response to a tripping operation of said mechanism upon completion of a record playing interval to engage said cam means during said limited rotational movement of said turntable and effectuate operation of said record separator means by said cam means, said blade elements being adapted to enter an air space between adjacent pairs of stacked records on said spindle at the bottom of a stack thereof, and said shelf elements being provided with cam surfaces on one side thereof for actuation by movement of a record when moved in one direction along said spindle.

BENJAMIN R. CARSON.

REFERENCES CITED

The following references are of record in the file of this patent:

UNITED STATES PATENTS

| Number | Name | Date |
|---|---|---|
| 1,438,000 | Underhill | Dec. 5, 1922 |
| 1,568,130 | Blackwell | Jan. 5, 1926 |
| 2,280,685 | Carson | Apr. 21, 1942 |
| 2,394,539 | Erwood et al. | Feb. 12, 1946 |

FOREIGN PATENTS

| Number | Country | Date |
|---|---|---|
| 551,388 | Great Britain | Feb. 19, 1943 |